United States Patent [19]

Pramaggiore

[11] Patent Number: 4,650,962

[45] Date of Patent: Mar. 17, 1987

[54] CIGAR OR CIGARETTE LIGHTER, PARTICULARLY FOR MOTOR VEHICLES

[76] Inventor: Luigi Pramaggiore, Strada Statale 26, 11010 Sarre (Aosta), Italy

[21] Appl. No.: 817,066

[22] Filed: Jan. 8, 1986

[51] Int. Cl.$^4$ ............................ F23Q 7/22; H05B 1/00
[52] U.S. Cl. .................................. 219/264; 219/220; 219/267; 219/269
[58] Field of Search ............................... 219/260–270, 219/220; 361/264–266

[56] References Cited

U.S. PATENT DOCUMENTS

| | | | |
|---|---|---|---|
| 2,180,703 | 11/1939 | Carissimi | 219/264 |
| 2,511,331 | 6/1950 | De La Mater | 219/261 |
| 2,612,588 | 9/1952 | Schilling | 219/262 |
| 2,918,559 | 12/1959 | Pramaggiore | 219/269 |
| 3,134,885 | 5/1964 | Pramaggiore | 219/264 |
| 3,692,976 | 9/1972 | Pramaggiore | 219/269 X |
| 3,878,359 | 4/1975 | Jannello | 219/261 |
| 4,293,761 | 10/1981 | Pramaggiore | 219/269 |

FOREIGN PATENT DOCUMENTS 593941  5/1959  Italy ................................ 219/267

Primary Examiner—Anthony Bartis

[57] ABSTRACT

A cigar or cigarette lighter, particularly for mounting on the instrument panel of a motor vehicle, is effective to light the cigar or cigarette when a control knob is moved within a cylindrical casing, the control knob being connected to a metal rod which is provided at its inner end with a movable contact engageable with a fixed contact to energize an electrical heating resistance element within a hot plate, the cigar or cigarette being lighted when placed against the heating plate on energizing the heating resistance element to incandescence. A bimetal safety contact is insulatingly fitted on a threaded stem below the hot plate, the threaded stem also carrying the hot plate at its inner end and feeds electric power thereto. The bimetal safety contact expands under prolonged heat action to establish a contact to the cylindrical casing which is grounded thereby producing a short circuit which blows a fuse in the instrument panel to interrupt the feed of electrical power to the lighter. A continuously energized LED indicator enables ready determination by the user of the location of the cigar or cigarette lighter.

8 Claims, 3 Drawing Figures

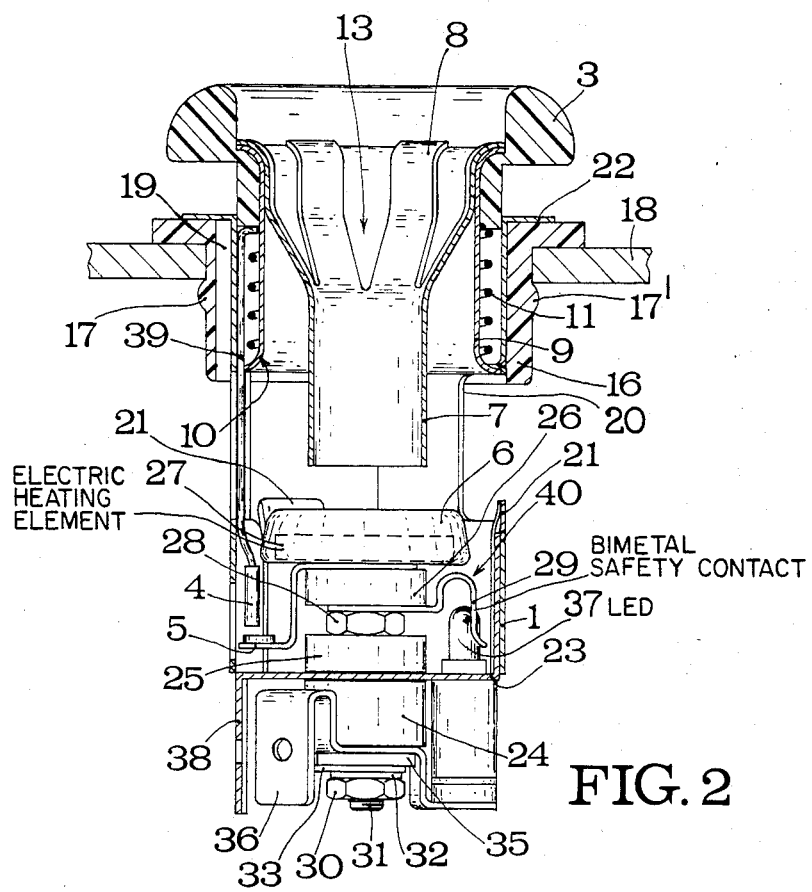
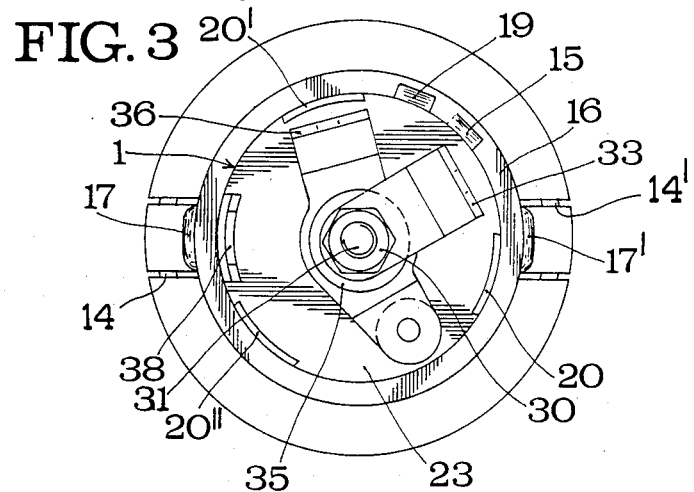

CIGAR OR CIGARETTE LIGHTER, PARTICULARLY FOR MOTOR VEHICLES

BACKGROUND OF THE INVENTION

This invention relates to an electric lighter for rapidly lighting cigars or cigarettes, particularly for motor vehicles.

U.S. Pat. No. 4,293,761 issued on October 6, 1981 to the same Applicant describes an improved cigarette lighter, particularly for motor vehicles, wherein lighting of the cigarette is obtained by actuating a tubular control knob which pushes an associated control rod to exert pressure on a pivotally mounted keeper which in turn is connected to a contact blade adapted to feed the heating resistance of the electric lighter.

However, this electric lighter has the drawback that its lighting time is relatively long and that it has no protective elements incorporated therein for interrupting the feed of power in case of a fault.

Further, the relatively great number of components used in the construction of this lighter, although they result in predictable operation thereof, reduce its competitiveness due to increased production costs.

It is therefore an object of the present invention to improve the operation of the lighter described in the aforementioned U.S. Patent by simple constructional expedients that may readily be carried out to ensure long life service and competitive production costs.

A particular advantage of the invention consists in providing a lighter the time of which is much shorter than far known lighters thereby to reduce the time during which a driver's attention is distracted.

A further advantage of the invention consists in the insertion of a bimetal contact into the central body of the lighting assembly so as to ensure adequate protection against excessively long incandescence of the electric heating element resistance due to potential incidental blocking of the lighter mechanism.

SUMMARY OF THE INVENTION

These and other objects and advantages of the invention, which will become apparent from the following description, are achieved according to the invention by an improved and simplified lighter for rapidly lighting cigars or cigarettes, particularly for motor vehicles. The lighter comprises a tubular control knob for completing and interrupting an electric feed circuit for a heating resistance element, the control knob being mounted for sliding movement within a cylindrical metal casing. A circular reinforcement is disposed in the interior of the tubular control knob and a spring is arranged about the reinforcement, a metal insert being provided within the reinforcement. A resilient sleeve is mounted about an upper end portion of the cylindrical casing and an electric heating resistance is arranged in the interior of a hot plate, ceramic support members being mounted on a threaded stem and locked in position on the stem. An ignition assembly is provided within the casing and comprises a plurality of resilient tabs firmly secured to a metal disk which carries the ceramic support members and the hot plate. The resilient tabs are snap fitted in openings in the casing. A light emitting diode, if included, is used to enable ready location of the lighter.

The improvement in the lighter resides in that a metal rod is mounted for sliding movement with the control knob. The metal rod is firmly secured at one end to the control knob, a contact being provided at the opposite end of the metal rod for engagement with or disengagement from a fixed contact connected to the electrical heating resistance element and arranged therebelow.

A bimetal strip may be provided and mounted at one of its end portions on the metal stem below the hot plate in insulated relation to and spaced from the hot plate. The bimetal strip has a laterally extending inverted U-shaped portion adjacent the hot plate and terminates at its opposite end in an outwardly directed leg portion adjacent the casing distant from the hot plate. The bimetal strip protects the lighter by short-circuiting it when the bimetal strip on expansion thereof, during energization of the heating resistance element, expands and contacts the casing. The electrical resistance element in the hot plate may have a value between 1.5 and 2 ohms.

BRIEF DESCRIPTION OF THE DRAWINGS

FIG. 2 is a section taken on the line II-II in FIG. 1, and

FIG. 3 is a plan view of the lower portion of the lighter of FIG. 1.

DESCRIPTION OF PREFERRED EMBODIMENT

Figure 1:
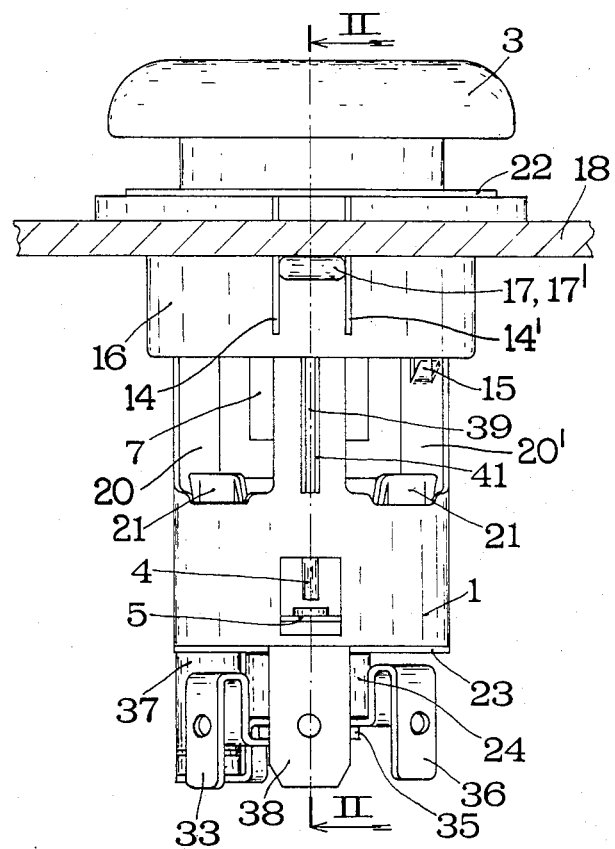
FIG. 1 is a front view of a lighter according to the invention.

As shown in the drawings, particularly FIG. 2, an electric lighter for lighting cigars or cigarettes according to the invention comprises a tubular metal casing 1 provided with peripheral openings 20, 20', 20" (cf. also FIG. 3) for weight reduction and ventilation purposes. A tubular control knob 3 is arranged upwardly of and for sliding movement in the interior of the tubular metal casing 1 for actuation of an electric movable contact 4 which is thereby pushed against another electric fixed contact 5 placed disposed below an ignition hot plate 6 to which it is firmly secured by means of a nut 28 screwed on a threaded stem 31.

The control knob 3 is returned to its inoperative position by a spring 11 located between a lower portion of the control knob 3 and a tubular reinforcement 9 within knob 3. The spring 11 is compressed by the control knob on inward movement thereof during the operative ignition phase and automatically returns the control knob to its inoperative position at the end of the operative phase.

The knob 3 is slidable relative to the tubular reinforcement 9 which is secured at its bottom end to casing 1 to enable compression and expansion of the spring on inward and outward movement of the knob 3, respectively. As will be seen in FIG. 2 the tubular reinforcement 9 has a lower bent, outwardly directed portion 10 for supporting the spring 11. At its upper end, the tubular reinforcement 9 likewise has a bent, outwardly directed portion which bears against a step formed by a reduced inner diameter portion of the control knob 3 for arresting the latter on its return stroke.

Further, a metal insert 13 is located in the inner portion of the reinforcement 9 and has spaced resilient blades 8 for resiliently connecting the insert 13 to the reinforcement 9 as the insert is inserted into the reinforcement. The metal insert 13 has a tubular inner end portion 7 adapted to receive a cigarette, and the metal insert being used when a cigarette is to be lit instead of a cigar.

A tab 15 projects laterally outwardly from the cylindrical casing 1 for locking a resilient sleeve 16 fitted on cylindrical casing 1. For locking sleeve 16 on cylindrical casing 1, a groove 19 on sleeve 16 is brought into alignment with tooth-shaped tab 15 and sleeve 16 is moved until it abuts against a stop 22 on cylindrical casing 1, sleeve 16 being then slightly rotated to the right or left. A pair of diametrically opposed ribs 17, 17' are provided on the outer surface of resilient sleeve 16 adjacent a pair of slits 14, 14' and abut against the edge of an instrument panel 18 to ensure fixing of the cylindrical casing 1 of the lighter on the instrument panel.

An ignition assembly, generally shown at 40 in FIG. 2, comprises a metal disk 23 from the outer periphery of which extend three equidistantly spaced resilient tabs 21 which are resiliently and detachably insertable in the peripheral openings 20, 20', 20" in cylindrical casing 1 as shown in FIG. 3.

Ceramic support members 24, 25, 26 are accommodated above and below the metal disk 23 and are retained in position by the threaded stem 31 which also serves for feeding power to an electric heating resistance element 27 incorporated in the ignition hot plate 6. The threaded stem 31 in turn is electrically connected to a contact blade 33.

The other end of the resistance element 27 is connected to the contact 5 which is locked in position between the hot plate 6 and the ceramic support member 26.

A bimetal safety contact 29 is secured by means of nut 28 to the underside of the ceramic support member 26. As the bimetal safety contact 29 expands under the prolonged action of heat which may be caused by incidental locking or failure of the lighter, it establishes a contact to the cylindrical casing 1 which is connected to ground, thus producing a short circuit which blows a fuse in the instrument panel of the motor vehicle to interrupt the feed of electric power to the lighter.

As the heating resistance element 27 cools down, the bimetal safety contact 29 contracts to its initial dimensions, to thereby eliminate the short circuit, again enabling use of the lighter for lighting a cigarette.

A contact blade 33 to which the positive feed pole is connected is secured to the lower portion of the ceramic support member 24 by means of a washer 32 and the nut 30 screwed onto the threaded stem 31. A mica washer 35 serving as an electric insulator, is interposed between the contact blade 33 and a contact blade 36 carrying a light emitting diode (LED) 37.

The light emitting diode is incorporated in the interior of the lighter to permit the latter to be easily and rapidly located by a passenger of the motor vehicle and as such diode is of small dimensions, can be readily accommodated within the limited space available in the interior of such a lighter.

A contact blade 38 is firmly secured to the disk 23 to permit ground connection when the lighter is mounted on insulating support members. The LED 37 is also carried by the disk and is always energized, and thus illuminated, being fed by contact blade 36 and connected to ground through metal disks 23 and contact blade 38.

OPERATION OF THE LIGHTER

The operation of the lighter according to the invention is as follows:

When the occupant of the motor vehicle wishes to light a cigarette, he or she depresses the control knob 3 which shifts the movable contact 4 connected thereto, by means of a metal rod 39 mounted for sliding movement in a rib 41 bent inward of the tubular casing 1. This manual actuation of the control knob 3 moves the contact 4 into electrical connection with the contact 5 and closes the electric circuit fed by the battery of the motor vehicle, the positive terminal of the battery being connected to contact blade 33 which supplies threaded stem 31, electric heating resistance element 27, within hot plate 6, fixed contact 5, movable contact 4, metal rod 39 and casing to ground, thus providing the incandescence of the electric heating resistance element 27. In other words, the electric circuit is energized by connecting the battery of the vehicle between contact plate 33 (positive polarity) and ground so as to energize the heating resistor element because one lead of the resistor heating element is connected to the positive side of the battery and the other lead to the negative side of the battery when contact 4 engages fixed contact 5.

To permit a cigarette or cigar to be more rapidly lit, the electric resistance of the electric heating element 27 has been reduced and selected to be between 1.5 and 2 ohms instead of between 2.5 and 3.5 ohms in conventional lighters of this type. Although this reduction affords a considerable economical advantage, it does not in the least impair the perfect operation of the lighter.

Although a preferred embodiment of the lighter has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. A lighter for rapidly lighting cigars or cigarettes, particularly for motor vehicles and comprising an elongate hollow casing having a longitudinal axis, a tubular control knob mounted for sliding movement within said casing, a tubular reinforcement within said tubular control knob and extending therebeyond in spaced relation to said casing so as to define an annular space between said casing and said tubular reinforcement, within which space said control knob is movable from an operative inward position to a normally inoperative outward position, said tubular reinforcement at an end thereof distant from said control knob being fixed to said casing whereby movement of said control knob is relative to said tubular reinforcement and said casing, a spring within said annular space and extending between an inner end of the control knob and said fixed end of said reinforcement and being wholly confined within said annular space for urging said control knob to its inoperative position, a movable contact assembly comprising an elongate metal rod having a portion thereof extending into said annular space and having one of its ends fixed to said inner end of the control knob for movement therewith relative to said casing, an opposite end of the metal rod carrying a movable contact for movement therewith on movement of said control knob between its said operative and inoperative positions, means including a metal disk connected within the casing and forming, at an end portion of the casing, distant from said tubular control knob, a closure for said casing, and a threaded stem supported by and extending through said metal disk into said casing along said casing longitudinal axis, said threaded stem serving as a support means for supporting a hot plate containing a heating resistance element in facing relation to said control knob, a fixed contact assembly having a blade portion operatively connected at one end portion thereof to said hot plate and provided at its opposite end with a fixed contact underlying said metal rod and said movable contact carried thereby, for engagement of said fixed contact by said movable contact when said control knob is moved from its inoperative to its operative position, engagement of the fixed contact by said movable contact completing an electrical circuit comprising an input terminal contact blade secured to a lower end of of said threaded stem below said metal disk and adapted for connection to an electric power source, said circuit including said heating resistance element in said hot plate, said movable contact carried by said metal rod, said fixed contact carried by said blade portion of said fixed contact assembly, and said metal disk connected to said casing, which disk has a groundable downwardly directed blade which when grounded grounds said casing, said metal rod being in electrical engagement with said casing during movement of said rod relative to said casing thereby to effectively connect said source of electrical power across said heating resistance element when said movable contact engages said fixed contact.

2. A lighter as in claim 1, wherein a bimetal strip is mounted at one of its end portions on said metal stem below said hot plate in insulated relation to and spaced from said hot plate, said strip having a laterally extending inverted U-shaped portion adjacent said hot plate and terminating at its opposite end in an outwardly directed leg portion adjacent said casing distant from said hot plate, said bimetal strip protecting the lighter by short-circuiting it when the bimetal strip on expansion thereof, during energization of the heating resistance element, contacts the casing.

3. A lighter as claimed in claim 1, wherein said electrical heating resistance element has a value of between 1.5 and 2 ohms.

4. The lighter of claim 1, wherein a metal insert is detachably inserted into said tubular reinforcement by means of a plurality of circumferentially spaced resilient blades, said metal insert having a downwardly extending tubular inner end portion of reduced diameter for guiding a cigar or cigarette into engagement with said hot plate.

5. The lighter of claim 1, wherein a resilient sleeve is provided outwardly about said hollow casing at an upper portion thereof for mounting the casing to an instrument panel.

6. The lighter of claim 1, wherein a plurality of ceramic support members are mounted on said threaded stem and locked in position thereon, said hot plate being carried by that one of the ceramic support members closest to said control knob.

7. The lighter of claim 1, wherein said metal disk has a plurality of resilient tabs detachably insertable in openings in said metal casing.

8. The lighter of claim 1, wherein a light emitting diode is supported by a contact blade carried by said threaded stem and permanently energized by said source of power.

* * * * *